United States Patent
Imagawa

(10) Patent No.: US 12,259,032 B2
(45) Date of Patent: Mar. 25, 2025

(54) STRAIN WAVE GEAR DEVICE

(71) Applicant: , Niigata (JP)

(72) Inventor: Yutaka Imagawa, Niigata (JP)

(73) Assignee: SKG INC., Niigata (JP)

( * ) Notice: Subject to any disclaimer, the term of this patent is extended or adjusted under 35 U.S.C. 154(b) by 0 days.

(21) Appl. No.: 18/688,484

(22) PCT Filed: Sep. 16, 2021

(86) PCT No.: PCT/JP2021/034077
§ 371 (c)(1),
(2) Date: Mar. 1, 2024

(87) PCT Pub. No.: WO2023/042331
PCT Pub. Date: Mar. 23, 2023

(65) Prior Publication Data
US 2024/0384784 A1  Nov. 21, 2024

(51) Int. Cl.
*F16H 49/00* (2006.01)
(52) U.S. Cl.
CPC ..... *F16H 49/001* (2013.01); *F16H 2049/003* (2013.01)
(58) Field of Classification Search
CPC .................. F16H 49/001; F16H 2049/003
USPC ........................................................ 74/640
See application file for complete search history.

(56) References Cited

U.S. PATENT DOCUMENTS

| | | | |
|---|---|---|---|
| 4,823,638 A * | 4/1989 | Ishikawa | F16H 55/0833 74/462 |
| 5,456,139 A * | 10/1995 | Aubin | F16H 49/001 74/462 |
| 2020/0032891 A1 * | 1/2020 | Kobayashi | F16H 49/001 |
| 2020/0040978 A1 * | 2/2020 | Kanayama | F16H 49/001 |
| 2020/0056653 A1 | 2/2020 | Hiroaki et al. | |

(Continued)

FOREIGN PATENT DOCUMENTS

| CN | 202431846 U | 9/2012 |
|---|---|---|
| CN | 110307322 A | 10/2019 |

(Continued)

OTHER PUBLICATIONS

Chinese Office Action dated Mar. 3, 2024 for Chinese Patent Appl. No. 202180098242.7.

(Continued)

*Primary Examiner* — Ha Dinh Ho
(74) *Attorney, Agent, or Firm* — Ohlandt, Greeley and Perle, L.L.P.

(57) ABSTRACT

A strain wave gear device includes: an internal gear; a wave generator; a flex gear including an outer gear and a first annular portion integrally formed with the outer gear of the same material; and an outputter that rotates together with the flex gear and includes a second annular portion facing against the first annular portion in a radial direction centered on an axis. The second annular portion is provided with a transmission tooth protruding radially while the first annular portion is provided with a recess to receive the transmission tooth. The recess is circumferentially wider than the transmission tooth and tolerates relative circumferential displacement of the flex gear with respect to the outputter. Transmission pairs, each including the transmission tooth and the recess, are circumferentially arranged.

10 Claims, 8 Drawing Sheets

(56) References Cited

U.S. PATENT DOCUMENTS

| | | | | |
|---|---|---|---|---|
| 2020/0063847 A1* | 2/2020 | Preuß | ............... | F01L 1/344 |
| 2020/0072318 A1* | 3/2020 | Shirouzu | ............... | F16H 49/001 |
| 2020/0232549 A1* | 7/2020 | Shirokoshi | ............... | F16H 57/04 |
| 2021/0140529 A1* | 5/2021 | Shirokoshi | ............... | F16C 35/06 |
| 2023/0140554 A1* | 5/2023 | Imagawa | ............... | F16H 49/001 |
| | | | | 74/412 R |

FOREIGN PATENT DOCUMENTS

| | | | |
|---|---|---|---|
| JP | 2018-194150 A | 12/2018 | |
| JP | 6552571 B2 | 7/2019 | |
| JP | 2020-197264 A | 12/2020 | |
| WO | 2019-030843 A1 | 2/2019 | |

OTHER PUBLICATIONS

International Search Report dated Oct. 12, 2021 for PCT Appl. No. PCT/JP2021/034077.

* cited by examiner

STRAIN WAVE GEAR DEVICE

BACKGROUND

1. Field of the Disclosure

The present disclosure relates to a strain wave gear device.

2. Discussion of the Background Art

There are known reducers that employ a strain wave gear device. For example, Patent Literature 1 discloses a strain wave gear device including a flex gear fitted into a wave generator that serves as an input rotating element, an internal gear that engages with the flex gear, and an output plate that rotates in accordance with rotation of the flex gear. The output plate is an output element for outputting decelerated rotation in the strain wave gear device. The flex gear is provided with a plurality of transmission pins arranged in a circumferential direction. The transmission pin includes a main element of the transmission pin, the main element extending along an axis of rotation of the output element, and a transmission roller that is rotatably supported by the main element of the transmission pin. The output plate is provided with holes into which the transmission rollers are inserted and that tolerate displacement of the transmission pins in at least one of the circumferential direction and a radial direction when rotation is conveyed.

Patent Literature 2 discloses a dual-type strain wave gear device provided with a pair of gears consisting of a first internally toothed gear and a second internally toothed gear that serve as a component corresponding to the aforementioned internal gear. In this gear device, an externally toothed gear corresponding to the aforementioned flex gear includes a first external gear that engages with the first internally toothed gear, a second external gear that engages with the second internally toothed gear, and a rim that connects the first external gear with the second external gear, all of which are integrally formed. While the first internally toothed gear is a fixed element that does not rotate, the second internally toothed gear is freely rotatable and serves as an output element in the strain wave gear device. In other words, this dual-type strain wave gear device transmits rotative power of the externally toothed gear from the second external gear to the second internally toothed gear and derives decelerated rotation output.

Citation List

Patent Literature

Patent Literature 1: Unexamined Japanese Patent Application Publication No. 2018-194150.

Patent Literature 2: Japanese Patent No. 6552571.

SUMMARY

Technical Problem

It is assumed here that a plurality of imaginary points is arranged in a circumferential direction centered on the axis of rotation of the output element and serves as a point for transmitting force from the rotating flex gear to the output element. A vector of the force applied to each imaginary point by the rotating flex gear is not uniformly oriented in the circumferential direction, and phases are shifted at some points due to flexibility of the flex gear, a shape of a cam of the wave generator, and the like. The flex gear that contains many such vectors of forces of which the phases are shifted in this manner has such a problem that unwanted stress not contributing to torque for rotating the output element is generated in the flex gear and unwanted twisting force is applied to the flex gear.

The configuration disclosed in Patent Literature 2 may fail to release the unwanted twisting force, causing the flex gear to be broken and resulting in a failure of the gear device. In addition, in the gear device disclosed in Patent Literature 2, the number of teeth of the second internally toothed gear serving as the output element is different from that of the second external gear of the flex gear. Due to this difference in the number of teeth, when the wave generator rotates, engagement positions between the second external gear and the second internally toothed gear are shifted in the circumferential direction, and relative positions of the flex gear and the output element may be shifted from desired positions, causing the gear device to fail. In addition, the dual-type strain wave gear device has a complex structure.

In contrast, the gear device disclosed in Patent Literature 1 can prevent generation of the aforementioned unwanted twisting force. However, this gearing also has a complex structure, and it is not easy to accurately mount the transmission pins into the flex gear. In addition, mounting the transmission pins into the flex gear may make the flex gear fragile.

An objective of the present disclosure is to provide a strain wave gear device having a simple structure that can reduce a risk of failure.

Solution to Problem

To achieve the objective described above, the strain wave gear device according to the present disclosure includes:

an internal gear including an inner gear formed along an inner peripheral surface of the internal gear;

a wave generator including a cam that rotates around an axis in accordance with a rotation input;

a flex gear including an outer gear having a ring shape, formed along an outer peripheral surface of the flex gear, and having a smaller number of teeth than that of the inner gear, an inner peripheral side of the flex gear being fitted around the wave generator; and an outputter that rotates relative to the internal gear in conjunction with the flex gear, wherein the cam has N poles, N being an integer of 2 or greater, positioned at equal intervals in a circumferential direction centered on the axis and causes the outer gear to engage with the inner gear at N positions, the flex gear includes a first annular portion that is formed of the same material as the outer gear and integrally formed with the outer gear, the first annular portion being positioned closer to the outputter in a direction along the axis than the outer gear is, the outputter includes a second annular portion that faces against the first annular portion in a radial direction centered on the axis, one of the first annular portion and the second annular portion is provided with a transmission tooth that protrudes in the radial direction while the other of the first annular portion and the second annular portion is provided with a recess to receive the transmission tooth, the recess has a width along the circumferential direction that is wider than that of the transmission tooth and tolerates relative displacement in the circumferential direction of the flex gear with respect to the outputter, and a plurality of transmission pairs, the transmission pair including the transmission tooth and the recess, is arranged in the circumferential direction.

According to the present disclosure, the strain wave gear device having a simple structure that can reduce a risk of failure can be provided.

DETAILED DESCRIPTION OF THE PREFERRED EMBODIMENT

An embodiment of the present disclosure is described with reference to the drawings.

Figure 1:
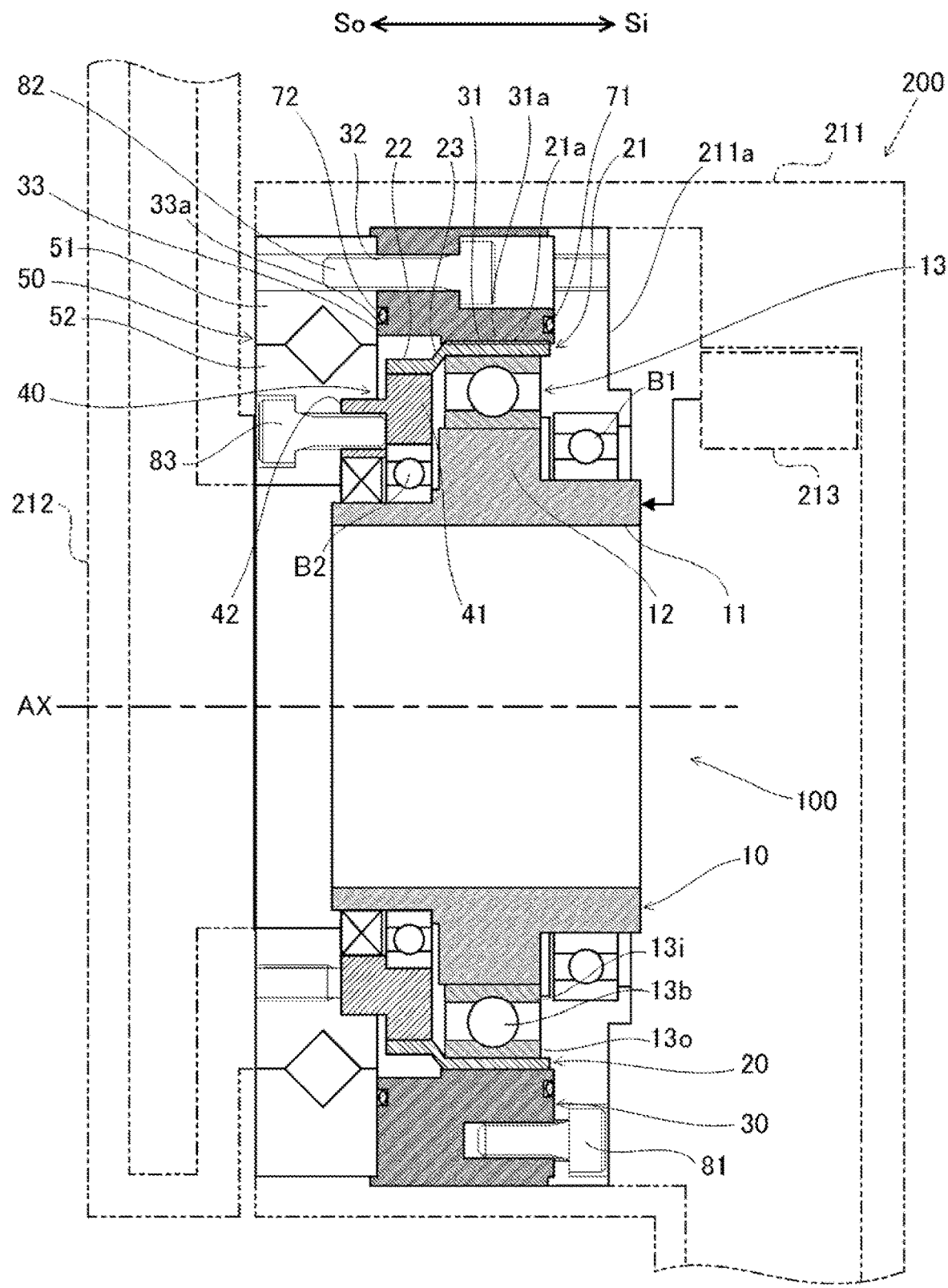
FIG. 1 is a schematic cross-sectional view of main components of a strain wave gear device according to an embodiment of the present disclosure.

As illustrated in FIG. 1, a strain wave gear device 100 is built into an industrial robot 200. For example, the robot 200 is constructed from a vertical articulated robot. The robot 200 includes a first arm 211, a second arm 212 connected to the first arm 211 through the strain wave gear device 100, a motor 213, and a controller (not illustrated). The motor 213 is constructed from a servomotor or the like, and operates in accordance with control by the controller. The controller rotates and drives the second arm 212 through the motor 213 built into the first arm 211 and the strain wave gear device 100 to control the second arm 212 with respect to positioning, angles, and rotation speed relative to the first arm 211.

The strain wave gear device 100 includes a wave generator 10, a flex gear 20, an internal gear 30, an outputter 40, and a supporter 50.

Note that, in FIG. 1, to make the drawing easier to view, hatching indicating a cross section is omitted in some of the components, and the components other than the strain wave gear device 100 are illustrated with an imaginary line. Hereinafter, in describing the components of the strain wave gear device 100, the right side in FIG. 1 may be referred to as an input side (indicated as "Si") and the left side may be referred to as an output side (indicated as "So").

The wave generator 10 includes a cylindrical axial portion 11, a cam 12 integrally formed with the cylindrical axial portion 11, and a wave bearing 13.

An end of the cylindrical axial portion 11 on the input side is rotatably supported by a bearing B1, and an end of the cylindrical axial portion 11 on the output side is rotatably supported by a bearing B2. The bearing B1 is mounted on a stationary portion 211a that does not move relative to the first arm 211. The bearing B2 is mounted on an inner peripheral surface of the outputter 40. For example, the bearings B1, B2 are constructed from a ball bearing. Thus, the cylindrical axial portion 11 is supported rotatably around an axis AX relative to the first arm 211. Rotative power of the motor 213 is transmitted to the cylindrical axial portion 11 by means of a publicly known transmission mechanism. The transmission mechanism may be a gearing system, a belt mechanism using a timing belt and a pulley, or the like.

The cam 12 is formed on and protrudes outwardly from an outer peripheral surface of the cylindrical axial portion 11 in a radial direction. The cam 12 is formed at a position adjacent to the bearing B1 in a direction along the axis AX (which may be referred to as the "axial direction" hereinafter). The cam 12 has N poles (where N is an integer of 2 or greater) positioned at equal intervals in a circumferential direction centered on the axis AX. Hereinafter, the number of poles of the cam 12 is referred to as the "pole number." For example, as illustrated in FIG. 2, when the pole number N=2, the cam 12 is elliptically shaped when viewed from the axial direction.

Figure 2:
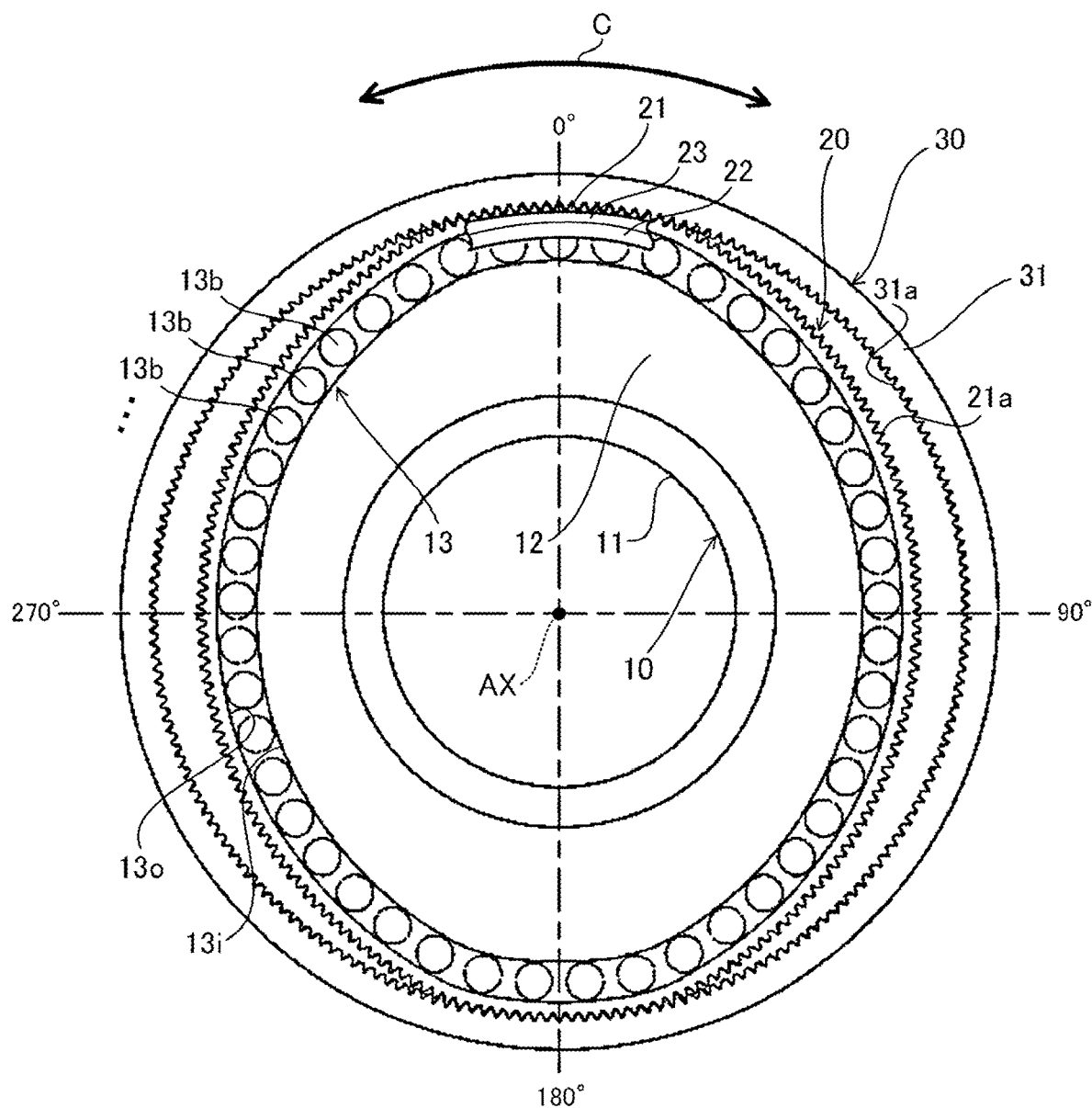
FIG. 2 is a diagram illustrating the main components of the strain wave gear device according to the embodiment viewed from a direction of an axis when the number of poles of a cam is two.

As illustrated in FIG. 1 and FIG. 2, the wave bearing 13 includes an inner ring 13i fixed to an outer peripheral surface of the cam 12, a flexible outer ring 13o, and a plurality of balls 13b placed in a rollable manner between the inner ring 13i and the outer ring 13o. Note that the inner ring 13i may be constructed from a portion including the outer peripheral surface of the cam 12.

The flex gear 20 is formed of a metallic material such as special steel in such a way as to have flexibility, and includes an outer gear 21, a first annular portion 22, and a connecting portion 23. The outer gear 21, the first annular portion 22, and the connecting portion 23 are integrally formed of the same material.

The outer gear 21 has a ring shape and includes a plurality of teeth 21a formed along an outer peripheral surface of the flex gear, and an inner peripheral side of the outer gear 21 is fitted around the outer ring 13o of the wave generator 10. The plurality of teeth 21a of the outer gear 21 is arranged along the circumferential direction at a constant pitch. The number of teeth t that is the number of the teeth 21a of the outer gear 21 is less than the number of teeth T that is the number of the teeth 31a of an inner gear 31 to be described later. For example, when the pole number of the cam 12 is N, the relationship between the number of teeth t and the number of teeth T is defined in such a way that T=t+N holds true. For example, when N=2, a relation of T=t+2 holds true.

Figure 4:
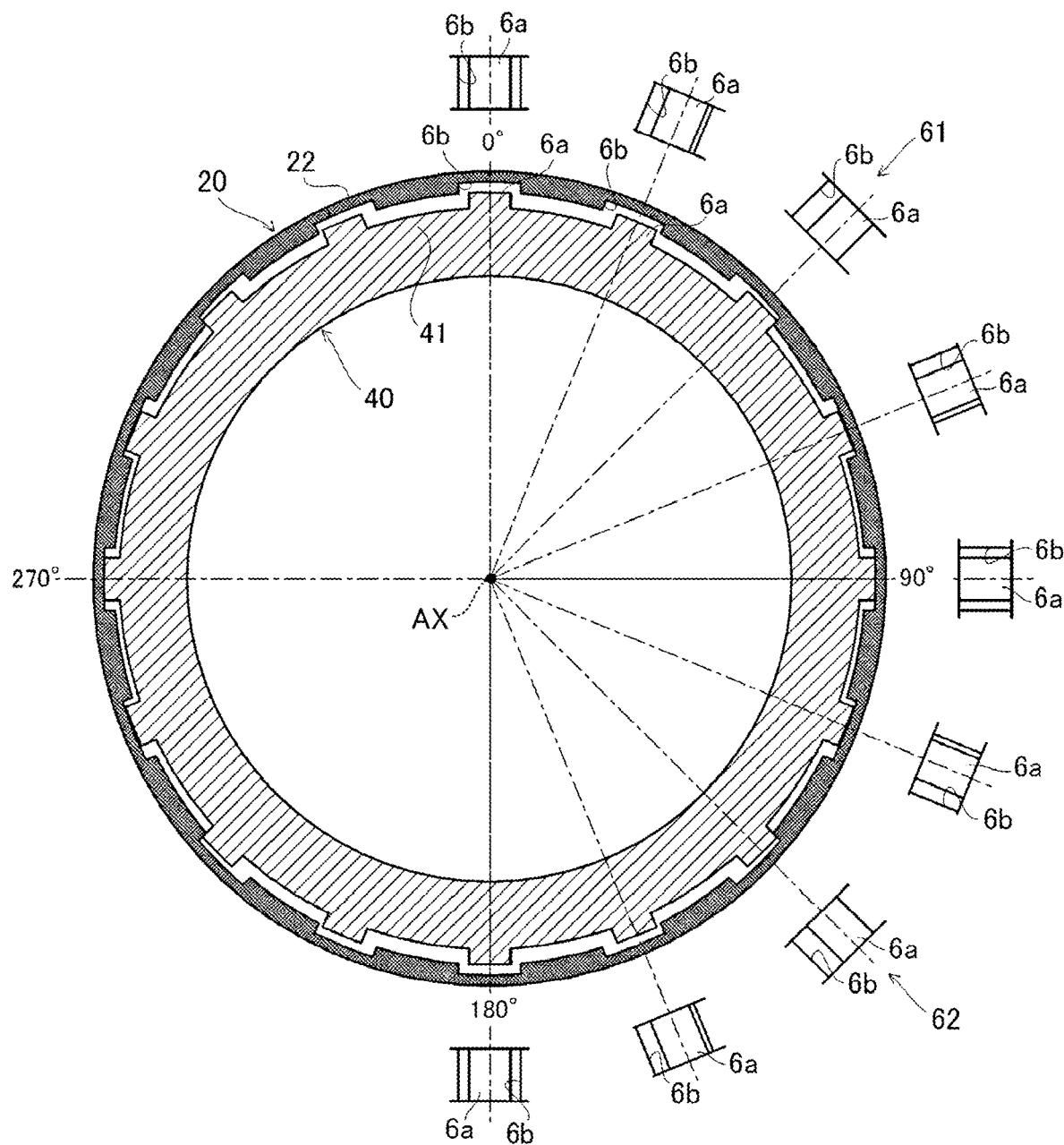
FIG. 4 is a diagram for describing an arrangement and a function of a transmission pair according to the embodiment.

The first annular portion 22 is an annular portion that is positioned closer to the outputter 40 in the axial direction than the outer gear 21. As illustrated in FIG. 4, the first annular portion 22 is provided with a recess 6b to receive a transmission tooth 6a of the outputter 40. The transmission tooth 6a engages with the recess 6b, causing power to be transmitted from the flex gear 20 to the outputter 40. The same number of the recesses 6b as the transmission teeth 6a are provided along the circumferential direction centered on the axis AX. The transmission teeth 6a and the recesses 6b are described later.

The connecting portion 23 connects the outer gear 21 with the first annular portion 22 having a diameter smaller than that of the outer gear 21. As illustrated in FIG. 1, the connecting portion 23 is inclined toward the first annular portion 22 from the outer gear 21 in such a way as to be closer to the axis AX.

Figure 3:
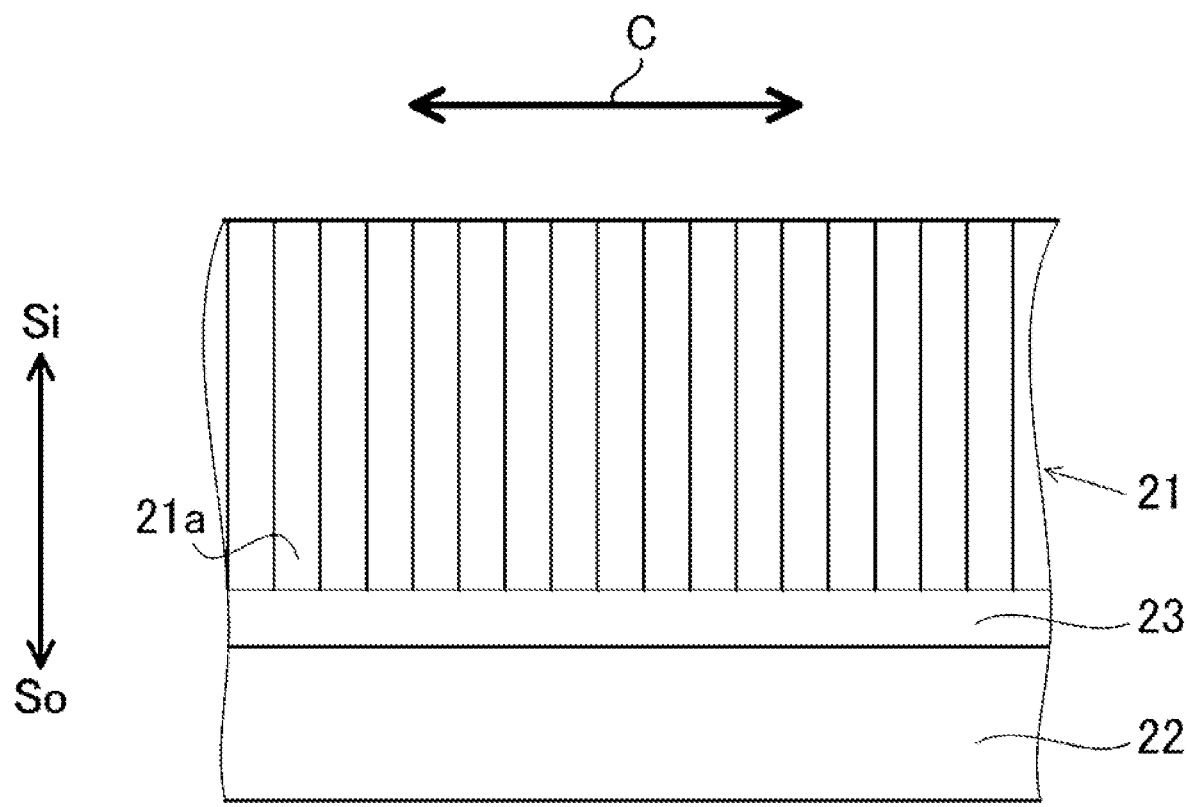
FIG. 3 is a diagram illustrating a portion of an outer peripheral surface of a flex gear in FIG. 2.

In FIG. 2 and FIG. 3, the first annular portion 22 of the flex gear 20 is partially illustrated. FIG. 3 is a diagram illustrating a portion of the outer peripheral surface of the flex gear 20 viewed from the 0° direction illustrated in FIG. 2.

The internal gear 30 is formed of a metallic material in such a way as to have rigidity, and fixed to an inner side of the first arm 211. The internal gear 30 includes the inner gear 31 that partially engages with the outer gear 21 of the flex gear 20 deflected by the cam 12. The inner gear 31 has a ring shape and includes a plurality of teeth 31a formed along an inner peripheral surface of the internal gear. The plurality of teeth 31a of the inner gear 31 is arranged along the circumferential direction at a constant pitch.

The internal gear 30 is formed generally in a cylindrical shape. On the input side of the strain wave gear device 100, the internal gear 30 and the stationary portion 211a on which the bearing B1 is mounted face against each other in the axial direction. In the internal gear 30, an annular groove centered on the axis AX is formed in a portion that faces against the stationary portion 211a, and an O-ring 71 fits into the groove. The internal gear 30 is fixed to the stationary portion 211a with a screw 81 that extends in the axial direction.

The outputter 40 rotates relative to the internal gear 30 in conjunction with the flex gear 20. The outputter 40 is supported by the supporter 50 rotatably around the axis AX relative to the internal gear 30. For example, the outputter 40 has a ring shape of a metallic material in such a way as to have rigidity.

The outputter 40 includes a second annular portion 41 that faces against the first annular portion 22 in a radial direction centered on the axis AX (which may be referred to simply as the "radial direction" hereinafter) and a supported portion 42 that is a portion positioned closer to the output side than the second annular portion 41 and supported by the supporter 50. As illustrated in FIG. 4, the second annular portion 41 according to the present embodiment is positioned radially inside of the first annular member 22 of the flex gear 20. The second annular portion 41 is provided with the transmission tooth 6a.

For example, the supporter 50 is constructed from a crossed roller bearing, and includes an outer ring 51 fixed to the internal gear 30 and an inner ring 52 fixed to the supported portion 42 of the outputter 40. The outer ring 51 is fixed to the internal gear 30 with a screw 82. The inner ring 52 is fixed to the supported portion 42 with a screw 83. The screws 82 and 83 both extend in the axial direction.

On the output side of the strain wave gear device 100, the internal gear 30 and the outer ring 51 of the supporter 50 face against each other in the axial direction. The internal gear 30 includes an insertion hole 32 that is formed along the axial direction and into which the screw 82 is inserted as well as a specific portion 33 positioned between the insertion hole 32 and the first annular portion 22. The specific portion 33 includes an annular groove 33a centered on the axis AX in a portion that faces against the outer ring 51 in the axial direction. An O-ring 72 fits into the annular groove 33a. The O-ring 72 and the aforementioned O-ring 71 prevent intrusion of water from outside of the gear device, leakage of oil from inside of the gear device, and the like.

In this embodiment, the outputter 40 is connected to the second arm 212 that serves as a load for the strain wave gear device 100 through the inner ring 52 of the supporter 50. With this configuration, the second arm 212 rotates around the axis AX in accordance with rotation of the outputter 40. Note that a mode of supporting the outputter 40 with the supporter 50 and a method of connecting the outputter 40 to the load may be modified as desired.

As illustrated in FIG. 1, the first annular portion 22 of the flex gear 20 and the second portion 41 of the outputter 40 are positioned between the supporter 50 and the cam 12 in the axial direction. The transmission tooth 6a of the second annular portion 41 is pushed by the recess 6b of the first annular portion 22 in the circumferential direction centered on the axis AX (which may be referred to simply as the "circumferential direction" hereinafter), causing the outputter 40 to rotate in conjunction with the flex gear 20.

The transmission tooth 6a is a structure for transmitting power from the flex gear 20 to the outputter 40. The transmission tooth 6a protrudes from an outer peripheral surface of the second annular portion 41 in the radial direction and the transmission tooth 6a is received by the recess 6b of the first annular portion 22.

The recess 6b is formed in an inner peripheral surface of the first annular portion 22. As illustrated in FIG. 4, the recess 6b has a width along the circumferential direction (a direction indicated by a sign C illustrated in FIG. 2 and FIG. 3) that is wider than that of the transmission tooth 6a. With this configuration, the recess 6b tolerates relative displacement in the circumferential direction with respect to the transmission tooth 6a (that is, relative displacement in the circumferential direction of the flex gear 20 with respect to the outputter 40). The width in the circumferential direction of each of the transmission teeth 6a and the recesses 6b may be set in such a way that a first pair 61 and a second pair 62 (to be described later) can appear as a pair including the transmission tooth 6a and the recess 6b. A plurality of transmission pairs, each of which is a pair including the transmission tooth 6a and the recess 6b, is provided along the circumferential direction and arranged at equal intervals in the circumferential direction.

Deceleration Operation

Next, a deceleration operation of the strain wave gear device 100 is described. Although the pole number N of the cam 12 may be set to any value according to a purpose as long as N is an integer of 2 or greater, a case is described here, in which N=2 and the cam 12 is elliptically shaped.

When the motor 213 operates in accordance with control by the controller of the robot 200, the rotative power of the motor 213 is transmitted to the cam 12 of the wave generator 10 through the transmission mechanism (not illustrated), and the cam 12 rotates at a relatively high speed around the axis AX.

In order to facilitate understanding of the description, it is assumed here that before starting rotation, the cam 12 is, as illustrated in FIG. 2, at an initial position where a major axis of the elliptical shape of the cam 12 is aligned with an axis that passes through 0° and 180°. The cam 12 being at the initial position causes the outer gear 21 of the flex gear 20 to engage with the inner gear 31 of the internal gear 30 at two engagement positions, 0° and 180°, that correspond to the two poles. Note that the illustrated angles are angles centered on the axis AX and when it is assumed that the direction of 12 o'clock is 0°, angles increase in a clockwise direction. It is also assumed that the cam 12 rotates clockwise.

Assuming that the angle by which the flex gear 20 rotates counterclockwise relative to the internal gear 30 is $\theta$ when the cam 12 rotates clockwise by an angle $\alpha$ from the initial position, $\theta = \{360° \times (T-t)/T\} \times \alpha/360° = (\alpha/T) \times N$ holds true.

When the cam 12 with the pole number N=2 is used, the difference in the number of teeth between the inner gear 31 and the outer gear 21 is T−t=N=2, and θ=(α/T)×2 holds true. For example, when this cam 12 rotates 90°, the flex gear 20 rotates counterclockwise by the angle θ=(90°/T)×2, that is, an amount corresponding to 1/2 tooth, which is 1/4) (90°/360°) of the difference in the number of teeth "2".

Thus, the flex gear 20 elastically deforms as the cam 12 rotates, and the engagement positions between the flex gear 20 and the internal gear 30 are sequentially shifted. When the cam 12 rotates 360°, the flex gear 20 rotates counterclockwise by the angle θ=(360°/T)×2, that is, an amount corresponding to the difference in the number of teeth "2". In this manner, the outputter 40 that rotates and moves in conjunction with the flex gear 20 is decelerated by a reduction ratio i=(T−t)/t compared to a rotation speed of the cam 12. In other words, the strain wave gear device 100 can control rotation of the load (in this example, the second arm 212) connected to the outputter 40 with output reduced by the aforementioned reduction ratio i with a high degree of accuracy. Note that the reduction ratio i may be set to any value, and may be set, for example, anywhere from 1/30 to 1/320.

Figure 5:
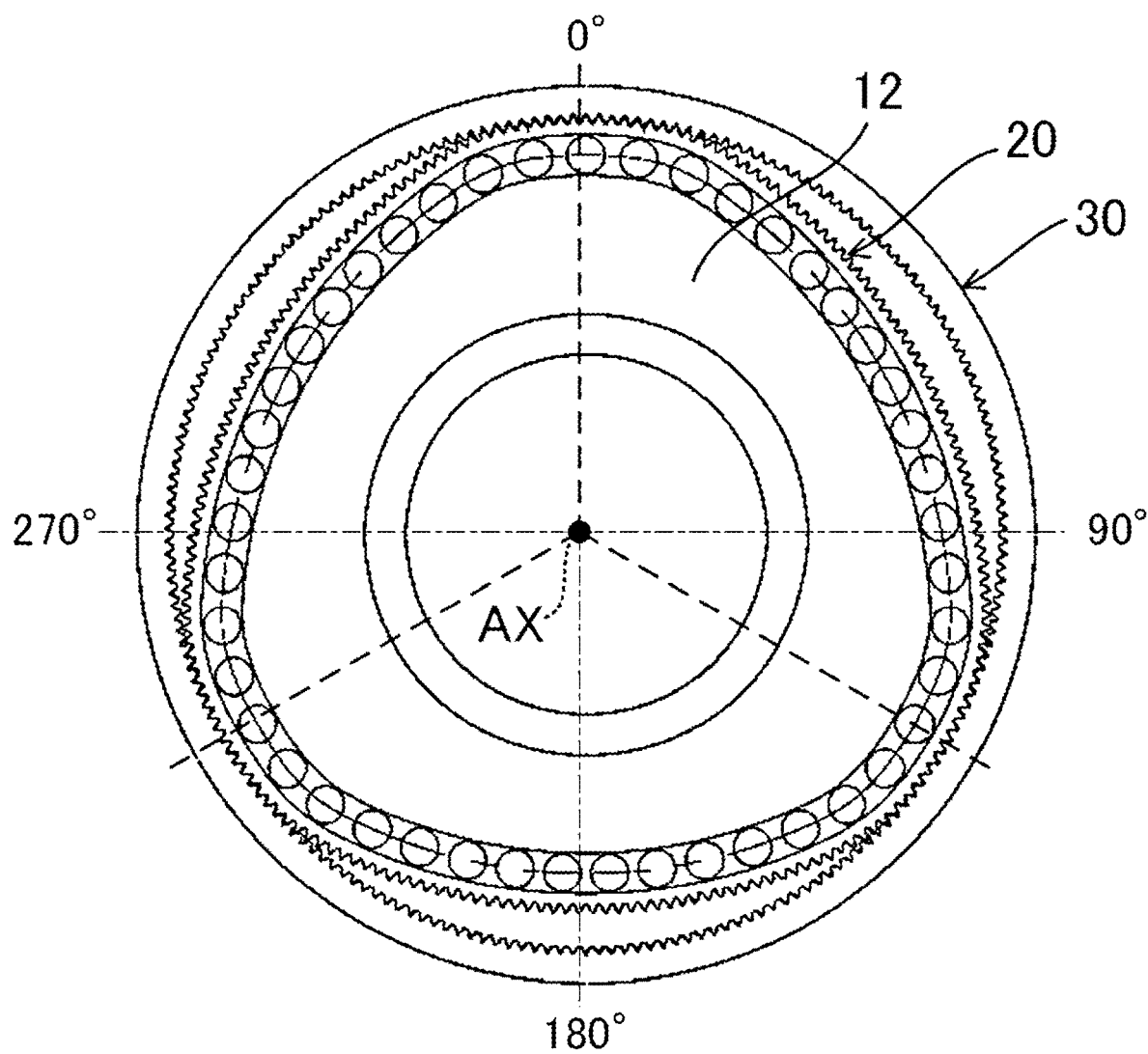
FIG. 5 is a diagram illustrating the cam and the flex gear viewed from the direction of the axis when the number of poles of the cam is three.
Figure 6:
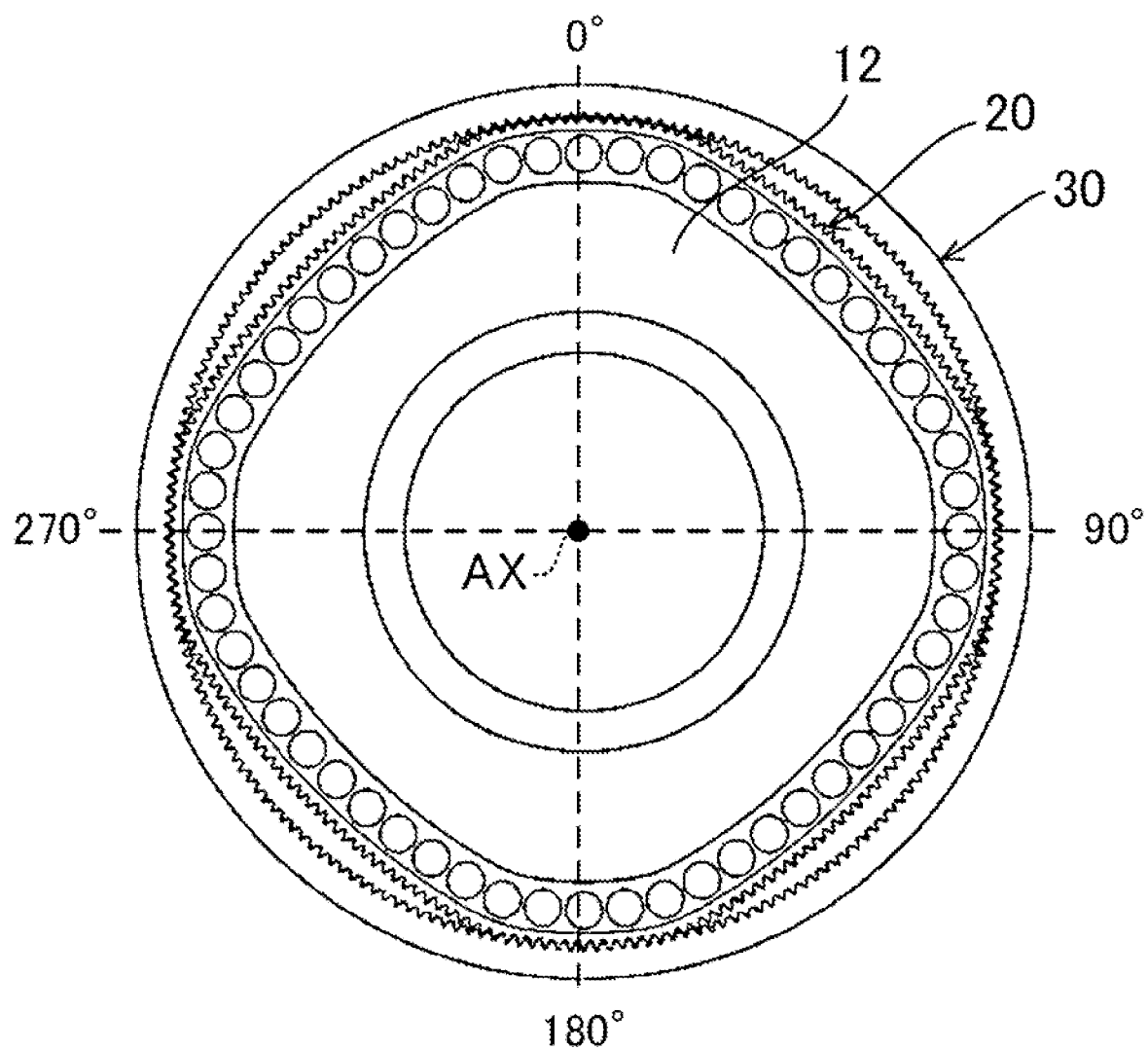
FIG. 6 is a diagram illustrating the cam and the flex gear viewed from the direction of the axis when the number of poles of the cam is four.

In the description given above, a case has been described in which the pole number N=2; however, the concept also applies to cases in which N≥3, and such cases are described together here. When then pole number N≥3, the shape of the cam 12 when viewed from the axial direction forms a regular N-gon shape, and each pole and each portion between adjacent poles have a curved surface that gently expands outwardly in the radial direction. FIG. 5 illustrates a case in which the pole number N is three while FIG. 6 illustrates a case in which the pole number N is four. Note that, although not illustrated in the drawings, a configuration in which N≥5 can be similarly realized.

The outer gear 21 of the flex gear 20 is deflected by the cam 12 having N poles through the wave bearing 13, and engages with the inner gear 31 of the internal gear 30 at N locations. When the pole number of the cam 12 is N, the relationship between the number of teeth t of the outer gear 21 (which may be referred to as the "number of teeth t of the flex gear 20" hereinafter) and the number of teeth T of the inner gear 31 (which may be referred to as the "number of teeth T of the internal gear 30" hereinafter) is defined in such a way that T=t+N holds true.

When the cam 12 rotates 360° clockwise, for example, the flex gear 20 moves by an amount corresponding to N teeth in a counterclockwise direction. In other words, assuming that the pole number of the cam 12 is N, when the cam 12 rotates by the angle (360°/N), the flex gear 20 moves by an amount corresponding to one tooth relative to the internal gear 30. When the pole number of the cam 12 is N, the outputter 40 fixed to the flex gear 20 is decelerated by the reduction ratio i=(T−t)/t=N/t compared to the rotation speed of the cam 12.

As described above, in the strain wave gear device 100, in a case in which the pole number N of the cam 12 is set to 2 or even N≥3, when the cam 12 of the wave generator 10 rotates in accordance with a rotation input from the motor 213, the engagement positions between the flex gear 20 and the internal gear 30 are shifted in the circumferential direction, and the flex gear 20 rotates relative to the internal gear 30 in a direction opposite to the direction of the rotation of the cam 12 in accordance with the difference in the number of teeth between the two gears.

Transmission Teeth 6a and Recesses 6b

Now, the transmission teeth 6a and the recesses 6b are described. FIG. 4 illustrates an example of a preferred arrangement of the transmission teeth 6a and the recesses 6b when the pole number N of the cam 12 is two.

Note that, in FIG. 4, illustrations located radially outside of the illustration of the flex gear 20 and the outputter 40 viewed from the axial direction illustrate relative displacement of the transmission teeth 6a with respect to the recesses 6b in a range from 0° to 180° when the cam 12 with the pole number N=2 rotates around the axis AX in accordance with operations of the motor 213 (hereinafter referred to as "relative displacement illustrations").

Referring to the relative displacement illustrations in FIG. 4, it is found that at each location where the transmission tooth 6a is provided, the position of the transmission tooth 6a relative to the recess 6b is not uniform. This is due to the phase shifting described in Technical Problem. The strain wave gear device 100 according to the present embodiment uses an effect to be described below of the transmission teeth 6a and the recesses 6b to reduce unwanted stress that is generated due to the phase shifting described above and that does not contribute to rotation of the outputter 40, and rotates the outputter 40 with excellent transmission efficiency.

In the example illustrated in FIG. 4, 16 transmission teeth 6a arranged at equal intervals in the circumferential direction are provided in the second annular portion 41 of the outputter 40. In addition, the first annular portion 22 of the flex gear 20 is provided with 16 recesses 6b to individually receive the 16 transmission teeth 6a. In the example illustrated in FIG. 4, there are 16 (=8×N) transmission pairs, the transmission pair being a pair including the transmission tooth 6a and the recess 6b, arranged in the circumferential direction every 360°/16) (=22.5°).

As illustrated in the relative displacement illustrations in FIG. 4, in the transmission pair located in the 0° direction, when the transmission tooth 6a is positioned at the center in the circumferential direction of the recess 6b, the transmission tooth 6a located in the 90° direction and the transmission tooth 6a located in the 180° direction are individually positioned at the center in the circumferential direction of the associated recess 6b. Since the transmission teeth 6a located in the 0°, 90°, and 180° directions are not in contact with the associated recess 6b in the circumferential direction, these transmission teeth do not contribute to rotation of the outputter 40.

Hereinafter, the transmission pair with the transmission tooth 6a positioned at the center in the circumferential direction of the recess 6b, as with the transmission pairs located in the 0°, 90°, and 180° directions in FIG. 4, is referred to as a "first state transmission pair." In other words, the first state transmission pair does not contribute to rotation of the outputter 40.

In contrast, when the first state transmission pairs are located in the 0°, 90°, and 180° directions, the transmission tooth 6a located in the 45° direction is positioned at one end (the end in the clockwise direction in the illustration) of the recess 6b to receive the transmission tooth 6a. In addition, in this state, the transmission tooth 6a located in the 135° direction is positioned at the other end in the circumferential direction (the end in the counterclockwise direction in the illustration) of the recess 6b to receive the transmission tooth 6a. The transmission tooth 6a located in the 45° direction comes into contact in the circumferential direction with the recess 6b of the flex gear 20 that moves in the counterclockwise direction when the cam 12 rotates clockwise; therefore, the transmission tooth 6a contributes to rotation of the outputter 40. The transmission tooth 6a located in the 135° direction comes into contact in the circumferential direction with the recess 6b of the flex gear 20 that moves in the clockwise direction when the cam 12 rotates counterclockwise; therefore, the transmission tooth 6a contributes to rotation of the outputter 40.

Hereinafter, the transmission pair with the transmission tooth 6a in contact in the circumferential direction with the recess 6b, as with the transmission pairs located in the 45° and 135° directions in FIG. 4, is referred to as a "second state transmission pair." In other words, the second state transmission pair contributes to rotation of the outputter 40.

The transmission pairs located in the 22.5°, 67.5°, 112.5° and 157.5° directions are intermediate state transmission pairs that are transitioning from one of the first state and the second state to the other of the first state and the second state. Since the transmission teeth 6a of the intermediate state transmission pairs are not in contact in the circumferential direction with the recesses 6b, the intermediate state transmission pairs do not contribute to rotation of the outputter 40, either.

The behaviors of the transmission teeth 6a and the recesses 6b in a range from 180° to 360° are the same as those of the transmission teeth 6a and the recesses 6b in the range from 0° to 180°. In other words, the first state transmission pair and the second state transmission pair alternately appear at locations where a center angle therebetween with respect to the axis AX is 45°. In addition, although the relative displacement illustrations in FIG. 4 are illustrated in a static manner, the first state transmission pair transitions through an intermediate state to the second state transmission pair in accordance with rotation of the flex gear 20. On the other hand, the second state transmission pair transitions through the intermediate state to the first state transmission pair.

The transmission pairs illustrated in FIG. 4 are summarized below.

In a case in which the pole number N of the cam 12 is two, when the cam 12 rotates by the angle (360°/2), the flex gear 20 moves by an amount corresponding to one tooth relative to the internal gear 30. In this manner, in the range of 180°, that is, a rotation angle of the cam 12 for moving the flex gear 20 by an amount corresponding to one tooth relative to the internal gear 30, the first state transmission pair and the second state transmission pair alternately appear every 180°/4=45°. The transmission pairs in the range of 180° include a first pair 61 with the transmission tooth 6a positioned at one end in the circumferential direction of the recess 6b, and a second pair 62 with the transmission tooth 6a positioned at the other end in the circumferential direction of the recess 6b.

In the relative displacement illustrations in FIG. 4, the first pair 61 is the transmission pair located in the 45° direction, and the second pair 62 is the transmission pair located in the 135° direction. Extending the range to 360°, 16 transmission pairs include two first pairs 61 arranged at equal intervals in the circumferential direction and two second pairs 62 arranged at equal intervals in the circumferential direction. The first pairs 61 and the second pairs 62 alternately exist every 90° in the range of 360°.

In FIG. 4, an example is illustrated in which 8×N=16 transmission pairs are provided; however, the number of the transmission pairs may be (4×N) by omitting transmission pairs corresponding to the intermediate state transmission pairs as illustrated in FIG. 4.

The concept described above is not limited to a case of N=2 and can be generalized. Therefore, a case in which the pole number of the cam 12 is N (an integer of 2 or greater) and (4×N) transmission pairs are provided is described. In order to facilitate understanding of the description, (4×N) is chosen as the number of the transmission pairs as a result of omitting the intermediate state transmission pairs. The transmission pairs are arranged at equal intervals in the circumferential direction.

When the cam 12 with the pole number N rotates by the angle (360°/N), the flex gear 20 moves by an amount corresponding to one tooth relative to the internal gear 30. Thus, in the range of (360°/N), that is, the rotation angle of the cam 12 for moving the flex gear 20 by an amount corresponding to one tooth relative to the internal gear 30, the first state transmission pairs and the second state transmission pairs alternately appear every 360°/(4×N). The transmission pairs in the range of (360°/N) include the first pair 61 and the second pair 62. Extending the range to 360°, the (4×N) transmission pairs include N pairs of the first pairs 61 arranged at equal intervals in the circumferential direction and N pairs of the second pairs 62 arranged at equal intervals in the circumferential direction. In addition, the first pairs 61 and the second pairs 62 alternately exist every 360°/(2×N).

As described above, since the first state transmission pairs and the second state transmission pairs alternately appear, the relative displacement of the transmission tooth 6a with respect to the recess 6b in the circumferential direction can be compensated by means of a so-called cam method. Therefore, the strain wave gear device 100 can reduce unwanted stress generated in each of the flex gear 20 and the outputter 40, the unwanted stress not contributing to torque for rotating the outputter 40, and reduce unwanted twisting force applied to the flex gear 20.

When the flex gear 20 deflected by the cam 12 rotates and moves relative to the internal gear 30, the flex gear 20 moves while engaging with the internal gear 30, resulting in generation of pulsation in the radial direction.

Note that FIG. 4 corresponds to a state in which the flex gear 20 engages with the internal gear 30 at two locations 0° and 180° that correspond to the poles of the cam 12. In other words, the flex gear 20 illustrated in FIG. 2 is associated with the flex gear 20 illustrated in FIG. 4. When the poles of the cam 12 are located at 0° and 180°, the transmission teeth 6a and the recesses 6b in the transmission pairs located at 0° and 180° are separated in the radial direction. In this case, the transmission teeth 6a and the recesses 6b in the transmission pairs located at 90° and 270° come closest to each other in the radial direction. Note that, when the transmission tooth 6a and the recess 6b in the transmission pair come closest to each other in the radial direction, the transmission tooth 6a and the recess 6b may be in contact or not in contact with each other in the radial direction.

In the transmission pairs located between 0° and 90°, a radial gap between the transmission tooth 6a and the recess 6b gradually decreases as the transmission pair approaches 90°. In the transmission pairs located between 90° and 180°, a radial gap between the transmission tooth 6a and the recess 6b gradually increases as the transmission pair approaches 180°. This relationship also holds true for a range between 180° and 360°.

As described above, in at least two transmission pairs at locations that correspond to the poles of the cam 12, the transmission tooth 6a and the recess 6b are separated in the radial direction. The first annular portion 22 tolerates displacement of the second annular portion 41 in the radial direction. The concept described above is not limited to a case of N=2, and can be generalized. In the strain wave gear device 100 in which the cam 12 has N poles, in at least N pairs of the transmission pairs at locations that correspond to the poles of the cam 12, the transmission tooth 6a and the recess 6b are separated in the radial direction. The first annular portion 22 tolerates displacement of the second annular portion 41 in the radial direction.

In the strain wave gear device 100 according to the present embodiment, since the first annular portion 22 can tolerate displacement of the second annular portion 41 in the radial direction, the strain wave gear device 100 can compensate the pulsation in the radial direction described above. This configuration can also reduce the unwanted stress described above. Note that each of the plurality of transmission pairs is configured to be shaped in such a way that the transmission tooth 6a does not come off from the recess 6b in any one of the first state, the second state, and the intermediate state.

The second state transmission pairs include the first pair 61 and the second pair 62 that are arranged at equal intervals in the circumferential direction. Because of this, force in the circumferential direction can be efficiently transmitted from the flex gear 20 to the outputter 40.

Consequently, the strain wave gear device 100 according to the present embodiment can significantly reduce mechanical loss generated when the flex gear 20 and the outputter 40 are completely fixed, and can achieve excellent transmission efficiency. In addition, the strain wave gear device 100 can prevent breakage of the flex gear 20.

Since output points (that is, positions where the transmission pair is formed) at which force is transmitted from the flex gear 20 to the outputter 40 can be evenly distributed in the circumferential direction, the load for a single engagement position between the flex gear 20 and the internal gear 30 is reduced; as a result, the outputter 40 can be rotated with high torque.

Note that the number of the transmission pairs is not limited to (4×N). The number of the transmission pairs may be changed as desired depending on the value of N.

For example, when the pole number N of the cam 12 is eight, assuming that there are (4×N)=32 transmission pairs, the first state transmission pairs and the second state transmission pairs alternately appear every {360°/(4×N)}=11.25° in a range of (360°/N)=45°, that is, the rotation angle of the cam 12 for moving the flex gear 20 by an amount corresponding to one tooth relative to the internal gear 30. Extending this to the 360° range, 32 transmission pairs include eight first pairs 61 arranged at equal intervals in the circumferential direction and eight second pairs 62 arranged at equal intervals in the circumferential direction.

However, since it is considered that four each for the first pairs 61 and the second pairs 62 is sufficient to stably rotate the outputter 40, the number of the transmission pairs may be (2×N)=16. In addition, it is considered that it is possible to provide a configuration that enable all transmission teeth 6a to contribute to rotation of the outputter 40 by setting the number of the transmission pairs to (2×N) not only in a case of N=8 and providing N pairs of the first pairs 61 and N pairs of the second pairs 62. Furthermore, the number of the transmission pairs may be set irrespective of the value N. For example, when 16 transmission pairs are arranged at equal intervals in the circumferential direction and at least four first pairs 61 and at least four second pairs 62 are provided, the outputter 40 can be stably rotated irrespective of the value N. In this manner, the outputter 40 in which the transmission teeth 6a are provided can be used in common irrespective of the pole number N of the cam 12, enabling manufacturing efficiency to improve.

As described above, even when the number of the transmission pairs is set to (2×N) or a fixed value (for example, 16) that is independent of the value N, the strain wave gear device 100 can reduce the unwanted stress and achieve excellent transmission efficiency by means of the effect as described above.

Note that a mode of the first pair 61, "the transmission tooth 6a positioned at one end in the circumferential direction of the recess 6b" may mean that the transmission tooth 6a is in contact with or close to the one end in the circumferential direction of the recess 6b. Similarly, a mode of the second pair 62, "the transmission tooth 6a positioned at the other end in the circumferential direction of the recess 6b" may mean that the transmission tooth 6a is in contact with or close to the other end in the circumferential direction of the recess 6b. In other words, when the flex gear 20 moves toward the transmission tooth 6a, a mode of the first pairs 61 and the second pairs 62 may mean that the transmission tooth 6a can be immediately pushed in the circumferential direction by the recess 6b.

In addition, a state in which the plurality of transmission pairs is "arranged at equal intervals in the circumferential direction" may mean that the transmission teeth 6a arranged at equal intervals in the circumferential direction are individually received by the associated recesses 6b. For example, the transmission pairs located in the 0°, 90°, and 180° directions refer to the transmission pairs in which the transmission teeth 6a are located in the 0°, 90°, and 180°. This relationship holds true for other angles. Note that, since the recesses 6b are formed in the flex gear 20 with flexibility, depending on the state of the transmission pair, the position of the recess 6b relative to the transmission tooth 6a is shifted by an angle between −2 degrees to +2 degrees.

As long as the first pairs 61 and the second pairs 62 can be provided, the plurality of transmission pairs does not have to be arranged at equal intervals in the circumferential direction. In this case, in light of stably rotating the outputter 40, the center of gravity of the entire outputter 40 provided with the plurality of transmission teeth 6a is preferably aligned with the axis AX and that a moment of inertia of the outputter 40 around the axis AX is minimized.

In the strain wave gear device 100, the first annular portion 22 of the flex gear 20 and the second annular portion 41 of the outputter 40 are positioned between the supporter 50 and the cam 12. This enables a distance in the axial direction from an element providing rotation input to an output element to be shortened. Consequently, each component can be made smaller in the axial direction, and a size of the strain wave gear device 100 can be reduced. In addition, when the distance in the axial direction from the element providing rotation input to the output element is short, stress in a diagonal direction with respect to the axis AX is less likely to be applied to the flex gear 20 and the internal gear 30 that engage with each other. As a result, a tooth peak of one of the flex gear 20 and the internal gear 30 and a tooth bottom of the other of the flex gear 20 and the internal gear 30 can be brought into contact along the axial direction, and abrasion of the gears can be reduced.

In the strain wave gear device 100, not only the cam 12, but also the flex gear 20 and the outputter 40 are hollow and ring-shaped when viewed from the axial direction. Therefore, it is possible to secure space for wiring or the like to pass through inside the gear device. In addition, since the end on the output side of the flex gear 20 is not closed, flexibility of the flex gear 20 can be kept while securing a certain thickness of the flex gear 20. Thus, the flex gear 20 can have excellent resistance to buckling and the flex gear 20 is less likely to break. The thickness of the flex gear 20 is not limited but the thickness may be set to, for example, around 0.5 mm to 1 mm. The flex gear 20 has a bottomless cylindrical shape, making it easy to be machined. Obviously, the strain wave gear device 100 can eliminate backlashes in principle and minimize lost motion.

According to the strain wave gear device 100, variations can be provided not only for a case in which the pole number N of the cam 12 is two, but also for a case of N≥3, which leads to an advantage to be described below. First, a case is considered in which the cam 12 of the wave generator 10 is configured to be elliptically shaped (N=2). Assuming that a diameter of a pitch circle of the internal gear 30 is D and a diameter of a pitch circle of the flex gear 20 is d, it may be considered that for the reduction ratio i, i=(T−t)/t=2/t or i=(D−d)/d holds true. In this case, to decrease the value of the reduction ratio i (that is, to derive more decelerated rotation output), it is necessary to increase the number of teeth t or to increase a ratio of the diameter d of the flex gear 20 to the diameter D of the internal gear 30. On the other hand, to increase the value of the reduction ratio i (that is, to reduce the degree of reduction in rotation output), it is necessary to decrease the number of teeth t or decrease the ratio of the diameter d of the flex gear 20 to the diameter D of the internal gear 30. As just described, relying solely on the elliptically shaped cam 12 imposes various restrictions on the size of the gear device and conditions, making it difficult to realize any given reduction ratio.

In contrast, according to a variation in which the pole number of the cam 12 is N≥3, even if at least one of the number of teeth T of the internal gear 30 and the number of teeth t of the flex gear 20 is kept constant, as is evident from the reduction ratio i=N/t, the value of the reduction ratio can be increased simply by increasing the pole number, and the value of the reduction ratio can be decreased simply by decreasing the pole number. In addition to variations of the pole number, by changing settings of the number of teeth T or the number of teeth t and the diameter of the flex gear 20 or the internal gear 30, it is possible to realize substantially countless numbers of variations of the reduction ratio.

Note that the present disclosure is not limited to the embodiment described above and the drawings. Modifications (including omission of components) may be made as appropriate without departing from the scope of the present disclosure. In the following, modified examples of the strain wave gear device 100 in which some of the components are modified are described.

Modified Example 1

Figure 7:
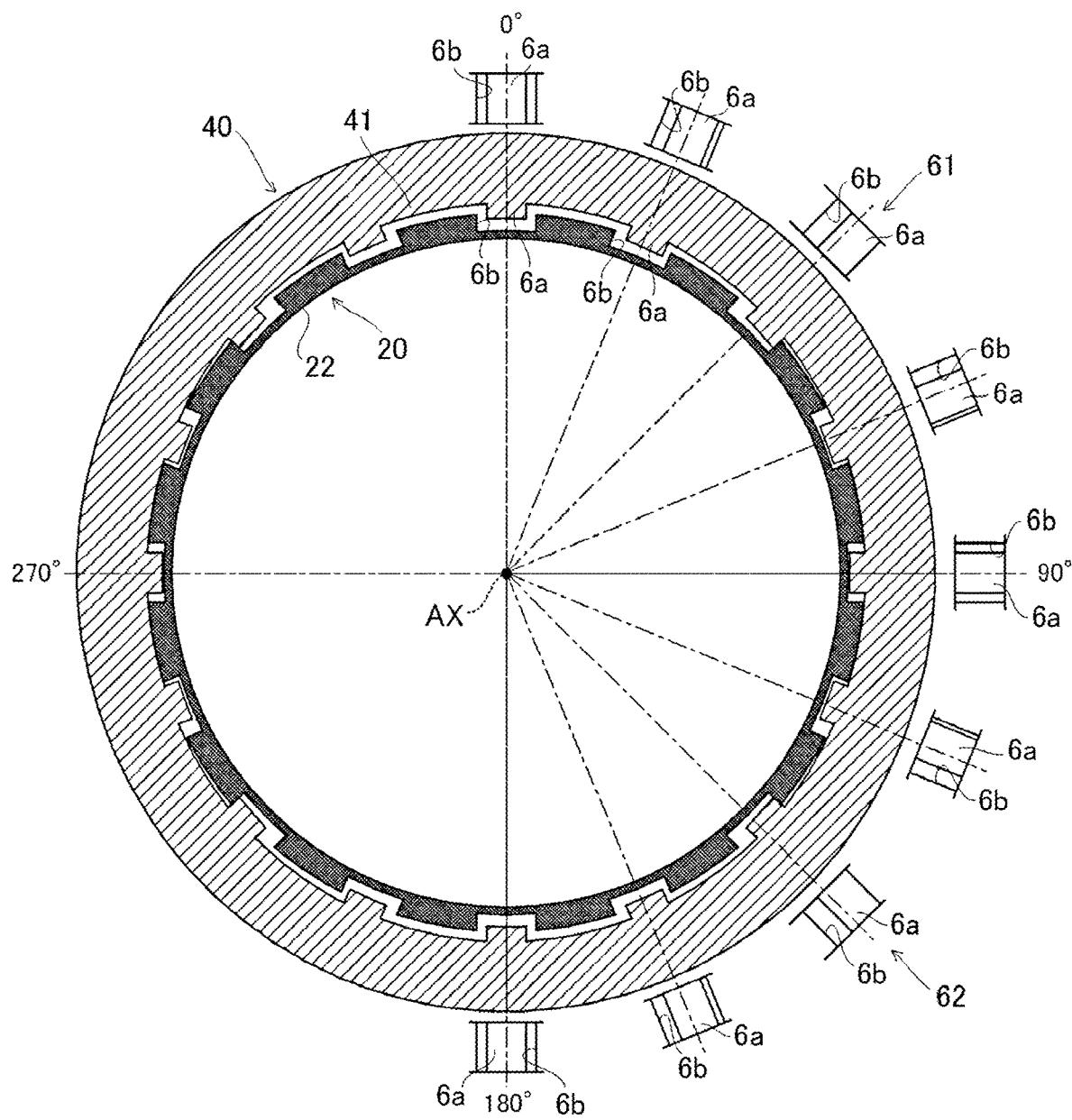
FIG. 7 is a diagram for describing an arrangement and a function of a transmission pair according to Modified Example 1.

As in Modified Example 1 illustrated in FIG. 7, the outputter 40 may be positioned radially outside of the flex gear 20. In this case, the second annular portion 41 of the outputter 40 is positioned radially outside of the first annular portion 22 of the flex gear 20. The transmission tooth 6a fixed to the second annular portion 41 extends toward the axis AX and is received by the recess 6b formed in the first annular portion 22. Note that, in FIG. 7, illustrations located radially outside of the illustration of the flex gear 20 and the outputter 40 viewed from the axial direction illustrate the relative displacement of the transmission teeth 6a with respect to the recesses 6b in a range from 0° to 180° when the cam 12 with the pole number N=2 rotates around the axis AX in accordance with operations of the motor 213. In Modified Example 1, the number and the function of the transmission pairs that are pairs including the transmission tooth 6a and the recess 6b may be considered to be the same as those in the embodiment described above.

Modified Example 2

Figure 8:
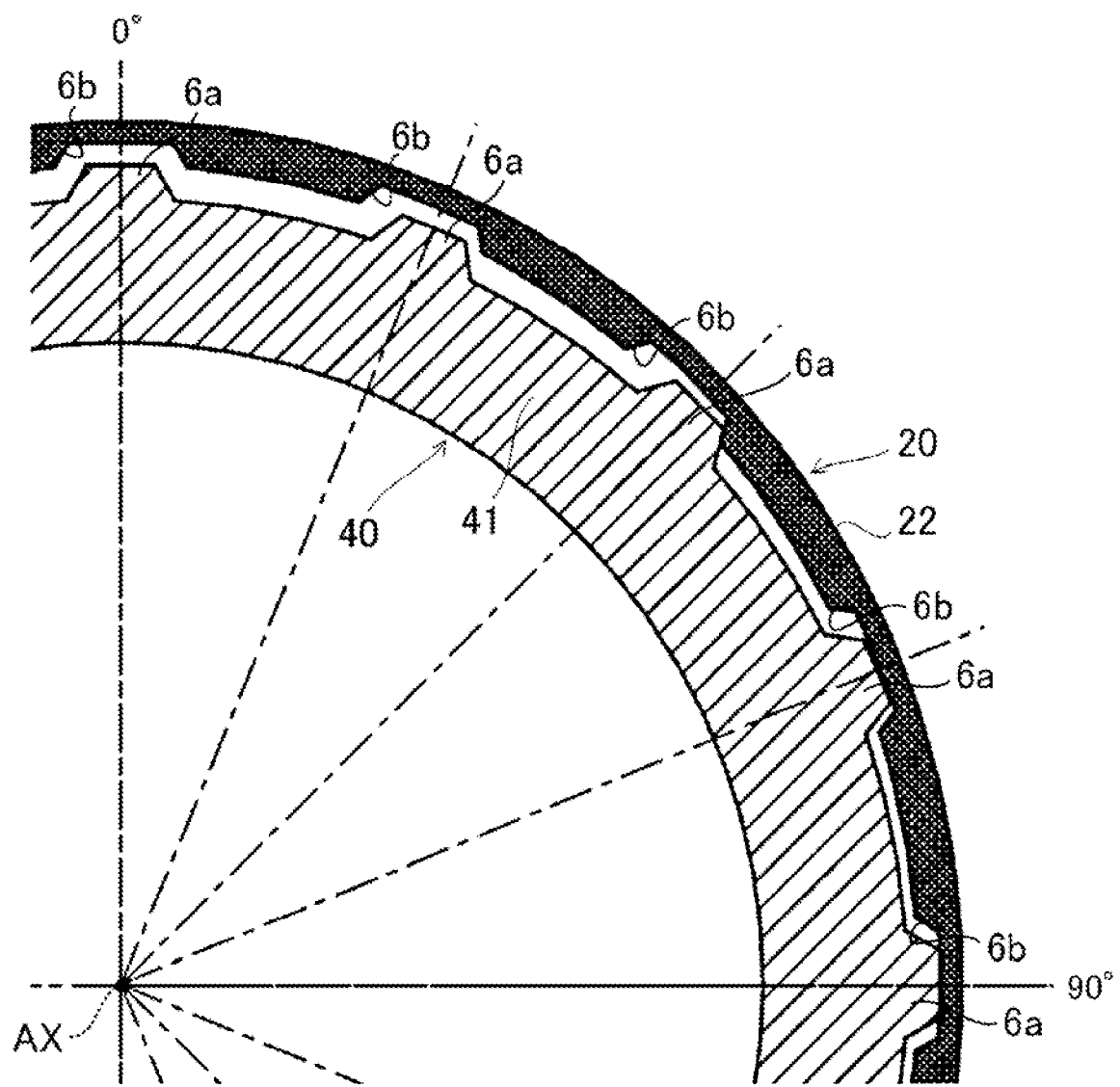
FIG. 8 is a diagram illustrating a shape of a transmission pair according to Modified Example 2.

In the embodiment and Modified Example 1 described above, examples in which the transmission teeth 6a have a uniform width and protrude and the recesses 6b also have a uniform width and are concave; however, shapes of the transmission portion 6a and the recesses 6b are not limited and may be modified as desired. For example, as in Modified Example 2 illustrated in FIG. 8, the transmission tooth 6a may be tapered toward the recess 6b, and the recess 6b may be formed in a tapered concave shape matching the shape of the transmission portion 6a.

In the above, examples have been described in which the transmission tooth 6a is formed in the second annular portion 41 and the recess 6b is formed in the first annular portion 22, but the relationship may be reversed. In other words, if the element between adjacent recesses 6b is considered as a transmission tooth and the element between adjacent transmission teeth 6a is considered as a recess, it is possible to express that the recess is formed in the second annular portion 41 and the transmission tooth is formed in the first annular portion 22. Even if this expression is used, the number and the function of the pairs including the transmission tooth and the recess may be considered to be the same as those in the embodiment described above. In this expression, a state in which the plurality of transmission pairs is "arranged at equal intervals in the circumferential direction" may mean that, for example, the transmission teeth are individually received by the associated recesses arranged at equal intervals in the circumferential direction.

In the above, examples have been described in which the strain wave gear device 100 is built into the robot 200 constructed from a vertical articulated robot, however, the present disclosure is not limited thereto. The strain wave gear device 100 can be built into various types of robots such as a horizontal articulated robot, a delta robot, and the like. In addition, the strain wave gear device 100 may be built into any device, not limited to a robot, and the device may be any device as long as the device is used for deriving decelerated rotation output decelerated by a desired reduction ratio from the rotation input. The strain wave gear device 100 may be built into a device other than a robot, for example, a precision machine, hobby equipment, home electronics, a vehicle-mounted device, or the like.

The number of teeth t of the flex gear 20 and the number of teeth T of the internal gear 30 may be set to any value as long as T>t holds true. However, when the pole number of the cam 12 is N, the relationship between the number of teeth t and the number of teeth T is preferably defined in such a way that T=t+N holds true.

Components constituting the strain wave gear device 100 may be made of any material, not limited to metal; the material may be appropriately selected according to a purpose, for example, from engineering plastics, resins, ceramics, and the like.

(1) The strain wave gear device 100 described above includes, as a structure that transmits the power from the flex gear 20 to the outputter 40, the transmission pairs that are pairs including the transmission tooth 6a and the recess 6b. The recess 6b has a width along the circumferential direction that is wider than that of the transmission tooth 6a and tolerates relative displacement in the circumferential direction of the flex gear 20 with respect to the outputter 40. As described above, this configuration can reduce the unwanted stress applied principally to the flex gear 20; therefore, the strain wave gear device 100 is less likely to break.

In addition, the flex gear 20 includes the first annular portion 22 that is integrally formed with the outer gear 21 and formed of the same material as the outer gear 21. Therefore, the flex gear 20 has a simple structure. The flex gear 20 is easy to produce since the flex gear 20 including the outer gear 21 as well as the first annular portion 22, which is the portion for transmitting force to the outputter 40, can be produced at a time, for example, by cutting work.

Furthermore, in the strain wave gear device 100 according to the present disclosure, the flex gear 20 and the outputter 40 rotate together. In other words, when the cam 12 rotates, a transmission tooth 6a received by a recess 6b is not shifted to the adjacent recess 6b, and engagement between the transmission tooth 6a and the recess 6b that constitute a single transmission pair is kept. The flex gear 20 according to the present disclosure constitutes a gear mechanism in which the outer gear 21 rotates relative to the internal gear 30 while engagement positions with the inner gear 31 are shifted and the first annular portion 22 rotates while engaging with the second annular portion 41 of the outputter 40. This makes a big difference from the aforementioned dual-type strain wave gear device in which engagement positions between the externally toothed gear corresponding to the flex gear 20 and a gear provided in the output element are shifted. As described above, the strain wave gear device 100 in which engagement between the transmission tooth 6a and the recess 6b is kept is less likely to cause a problem of relative positions of the flex gear 20 and the output element being shifted from desired positions compared to the dual-type strain wave gear device.

In addition, by setting the pole number N to any desired value, various reduction ratios can be realized with a simple configuration.

(2) The number of the transmission pairs may be 2×N or more, and the transmission pairs may be arranged at equal intervals in the circumferential direction. With this configuration, since the output points at which the force is transmitted from the flex gear 20 to the outputter 40 can be evenly distributed in the circumferential direction, the outputter 40 can be rotated with high torque. Note that the number of the transmission pairs may be 4×N or more or a fixed number (for example, 16) independent of the pole number N.

(3) The plurality of transmission pairs includes transmission pairs that satisfy conditions for the first pair 61 and the second pair 62 when the cam 12 rotates around the axis AX. With this configuration, as described above, the force in the circumferential direction can be efficiently transmitted from the flex gear 20 to the outputter 40.

(4) Preferably, the number of the first pairs 61 is N and the number of the second pairs 62 is N.

(5) Preferably, the first pairs 61 and the second pairs 62 alternately exist every 360°/(2×N) in angles centered on the axis AX.

(6) In at least N pairs of the plurality of transmission pairs located at locations that correspond to the poles of the cam 12, the transmission tooth 6a and the recess 6b are separated in the radial direction. The first annular portion 22 tolerates displacement of the second annular portion 41 in the radial direction. With this configuration, the relative displacement of the flex gear 20 with respect to the outputter 40 in the radial direction can be also compensated, and the unwanted stress described above can be reduced even more.

(7) The first annular portion 22 has a diameter smaller than that of the outer gear 21. The flex gear 20 includes the connecting portion 23 that connects the outer gear 21 with the first annular portion 22 and that is formed of the same material as the outer gear 21 and the first annular portion 22 and integrally formed with the outer gear 21 and the first annular portion 22. With this configuration, a space that exists radially outside of the first annular portion 22 can be efficiently used. Since the flex gear 20 including the outer gear 21, the first annular portion 22, and the connecting portion 23 can be produced at a time, for example, by cutting work, the flex gear 20 is easy to produce (8) As illustrated in FIG. 4, with a configuration in which the second annular portion 41 is positioned radially inside of the first annular portion 22, it is possible to prevent an increase in the size of the strain wave gear device 100 in the radial direction.

(9) As illustrated in FIG. 7, with a configuration in which the second annular portion 41 is positioned radially outside of the first annular portion 22, space for wiring or the like to pass through can be secured near the axis AX of the strain wave gear device 100.

(10) The first annular portion 22 and the second annular portion 41 are positioned between the supporter 50 and the cam 12. With this configuration, as described above, a length in the axial direction from the cam 12 to the output point of the flex gear 20 can be reduced, each component can be made smaller in the axial direction, and the size of the strain wave gear device 100 can be reduced.

The internal gear 30 includes the insertion hole 32 into which the screw 82 is inserted and the specific portion 33 is positioned between the insertion hole 32 and the first annular portion 22. The specific portion 33 includes the annular groove 33a centered on the axis AX in the portion that faces against the outer ring 51 in the axial direction. The O-ring 72 fits into the annular groove 33a. The strain wave gear device 100 employs a structure in which the power is transmitted from the flex gear 20 to the outputter 40 by means of engagement between the first annular portion 22 and the second annular portion 41, and no fixing component for fixing the flex gear 20 to the outputter 40, such as a screw, is provided. If such a fixing component is provided in the radial direction, a length of the specific portion 33 in the radial direction becomes smaller. However, the strain wave gear device 100 described above does not require such a fixing component, and space into which the O-ring 72 fits can be secured in the specific portion 33. Thus, sealing function is not lost.

Note that the supporter 50 is not limited to a crossed roller bearing, and may be a ball bearing, a bearing that slidably and rotatably supports the outputter 40, or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

In the foregoing, descriptions of publicly known technical matters have been appropriately omitted to facilitate understanding of the present disclosure.

Reference Signs List

100 Strain wave gear device
10 Wave generator
AX Axis
11 Cylindrical axial portion
12 Cam
13 Wave bearing
20 Flex gear
21 Outer gear
22 First annular portion
23 Connecting portion
30 Internal gear
31 Inner gear
32 Insertion hole
33 Specific portion
33a Annular groove
40 Outputter
41 Second annular portion
42 Supported portion
50 Supporter
51 Outer ring
52 Inner ring
6a Transmission tooth
6b Recess
61 First pair
62 Second pair
72 O-ring

What is claimed is:

1. A strain wave gear device, comprising:
an internal gear including an inner gear formed along an inner peripheral surface of the internal gear;
a wave generator including a cam that rotates around an axis in accordance with a rotation input;
a flex gear including an outer gear having a ring shape, formed along an outer peripheral surface of the flex gear, and having a smaller number of teeth than that of the inner gear, an inner peripheral side of the flex gear being fitted around the wave generator; and
an outputter that rotates relative to the internal gear in conjunction with the flex gear, wherein
the cam has N poles, N being an integer of 2 or greater, positioned at equal intervals in a circumferential direction centered on the axis and causes the outer gear to engage with the inner gear at N positions,
the flex gear includes a first annular portion that is formed of the same material as the outer gear and integrally formed with the outer gear, the first annular portion being positioned closer to the outputter in a direction along the axis than the outer gear is,
the outputter includes a second annular portion that faces against the first annular portion in a radial direction centered on the axis,
one of the first annular portion and the second annular portion is provided with a transmission tooth that protrudes in the radial direction while the other of the first annular portion and the second annular portion is provided with a recess to receive the transmission tooth,
the recess has a width along the circumferential direction that is wider than that of the transmission tooth and tolerates relative displacement in the circumferential direction of the flex gear with respect to the outputter, and
a plurality of transmission pairs, the transmission pair including the transmission tooth and the recess, is arranged in the circumferential direction.

2. The strain wave gear device according to claim 1, wherein the number of the transmission pairs is 2×N or more and the transmission pairs are arranged at equal intervals in the circumferential direction.

3. The strain wave gear device according to claim 1, wherein the plurality of transmission pairs includes:
a first pair with the transmission tooth positioned at one end in the circumferential direction of the recess when the cam rotates around the axis, and
a second pair with the transmission tooth positioned at the other end in the circumferential direction of the recess when the cam rotates around the axis.

4. The strain wave gear device according to claim 3, wherein the number of the first pairs is N and the number of the second pairs is N.

5. The strain wave gear device according to claim 4, wherein the first pairs and the second pairs alternately exist every 360°/(2×N) in angles centered on the axis.

6. The strain wave gear device according to claim 1, wherein
in at least N pairs of the plurality of transmission pairs located at locations that correspond to the poles of the cam, the transmission tooth and the recess are separated in the radial direction, and
the first annular portion tolerates displacement of the second annular portion in the radial direction.

7. The strain wave gear device according to claim 1, wherein
the first annular portion has a diameter smaller than that of the outer gear, and
the flex gear includes a connecting portion that connects the outer gear with the first annular portion and that is formed of the same material as the outer gear and the first annular portion and integrally formed with the outer gear and the first annular portion.

8. The strain wave gear device according to claim 1, wherein the second annular portion is positioned radially inside of the first annular member.

9. The strain wave gear device according to claim 1, wherein the second annular portion is positioned radially outside of the first annular portion.

10. The strain wave gear device according to claim 8, further comprising:
a supporter that rotatably supports the outputter relative to the internal gear, wherein
the first annular portion and the second annular portion are positioned between the supporter and the cam,
the supporter includes an outer ring fixed to the internal gear with a screw that extends in the axial direction and an inner ring fixed to the outputter,
the internal gear includes:
an insertion hole that is formed along the axial direction and into which the screw is inserted; and
a specific portion positioned between the insertion hole and the first annular portion,
the specific portion includes an annular groove centered on the axis in a portion that faces against the outer ring in the axial direction, and
an O-ring fits into the annular groove.

* * * * *